United States Patent
Hwang et al.

(10) Patent No.: US 11,457,477 B2
(45) Date of Patent: Sep. 27, 2022

(54) METHOD FOR PERFORMING RANDOM ACCESS PROCEDURE IN NEXT GENERATION WIRELESS COMMUNICATION SYSTEM AND APPARATUS THEREFOR

(71) Applicant: LG Electronics Inc., Seoul (KR)

(72) Inventors: Daesung Hwang, Seoul (KR); Kijun Kim, Seoul (KR); Hyunsoo Ko, Seoul (KR); Suckchel Yang, Seoul (KR); Sangrim Lee, Seoul (KR); Seungmin Lee, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 414 days.

(21) Appl. No.: 16/089,927

(22) PCT Filed: Mar. 27, 2017

(86) PCT No.: PCT/KR2017/003249
§ 371 (c)(1),
(2) Date: Sep. 28, 2018

(87) PCT Pub. No.: WO2017/171322
PCT Pub. Date: Oct. 5, 2017

(65) Prior Publication Data
US 2020/0314908 A1    Oct. 1, 2020

Related U.S. Application Data

(60) Provisional application No. 62/372,793, filed on Aug. 9, 2016, provisional application No. 62/314,957, filed on Mar. 29, 2016.

(51) Int. Cl.
*H04W 74/08*    (2009.01)
*H04L 5/00*    (2006.01)
*H04W 56/00*    (2009.01)

(52) U.S. Cl.
CPC ....... *H04W 74/0833* (2013.01); *H04L 5/0055* (2013.01); *H04L 5/0057* (2013.01); *H04W 56/0005* (2013.01)

(58) Field of Classification Search
None
See application file for complete search history.

(56) References Cited

U.S. PATENT DOCUMENTS

| 2010/0110953 A1* | 5/2010 | Kim | H04W 56/00 370/311 |
| 2012/0155310 A1* | 6/2012 | Kreuzer | H04W 52/146 370/252 |

(Continued)

FOREIGN PATENT DOCUMENTS

| KR | 10-2007-0103703 | 10/2007 |
| KR | 10-2013-0084340 | 7/2013 |

(Continued)

OTHER PUBLICATIONS

International Search Report in International Application No. PCT/KR2017/003249, dated Jun. 23, 2017, 15 pages (with English Translation).

*Primary Examiner* — Adnan Baig
(74) *Attorney, Agent, or Firm* — Fish & Richardson P.C.

(57) ABSTRACT

Disclosed in the present application is a method for a terminal performing a random access procedure in a wireless communication system. Specifically, the method for performing a random access procedure comprises the steps of: transmitting, to a base station, a plurality of random access signals corresponding to a plurality of different beams in a transmission interval corresponding to the corresponding random access signal; receiving a random access response signal corresponding to one random access signal of the plurality of random access signals; and transmitting and receiving a signal to and/or from the base station, using a (Continued)

beam corresponding to the one random access signal, wherein the plurality of random access signals comprise identifier information of the terminal.

2 Claims, 13 Drawing Sheets

(56) References Cited

U.S. PATENT DOCUMENTS

| | | | | |
|---|---|---|---|---|
| 2013/0272220 A1* | 10/2013 | Li | ........................ | H04B 7/0848 |
| | | | | 370/329 |
| 2014/0016624 A1* | 1/2014 | Zou | ...................... | H04W 72/02 |
| | | | | 370/336 |
| 2014/0177607 A1* | 6/2014 | Li | ........................ | H04B 7/0695 |
| | | | | 370/336 |
| 2016/0095018 A1* | 3/2016 | Vajapeyam | ............. | H04L 47/27 |
| | | | | 370/331 |
| 2017/0086221 A1* | 3/2017 | Jover | .................. | H04W 74/004 |
| 2017/0295005 A1* | 10/2017 | Lee | ................... | H04W 36/0055 |
| 2018/0359790 A1* | 12/2018 | Ingale | ..................... | H04W 8/22 |

FOREIGN PATENT DOCUMENTS

| | | |
|---|---|---|
| KR | 10-2014-0056561 | 5/2014 |
| KR | 10-1563469 | 10/2015 |
| WO | 2015/089303 | 6/2015 |

* cited by examiner

FIG. 2
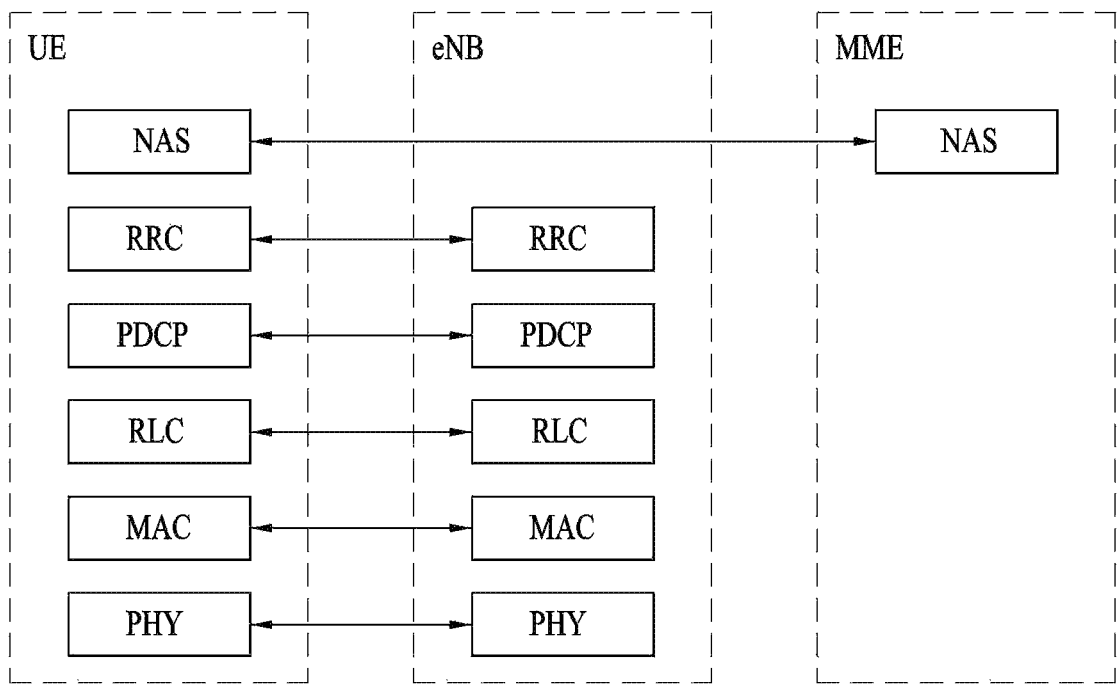
(A) CONTROL-PLANE PROTOCOL STACK
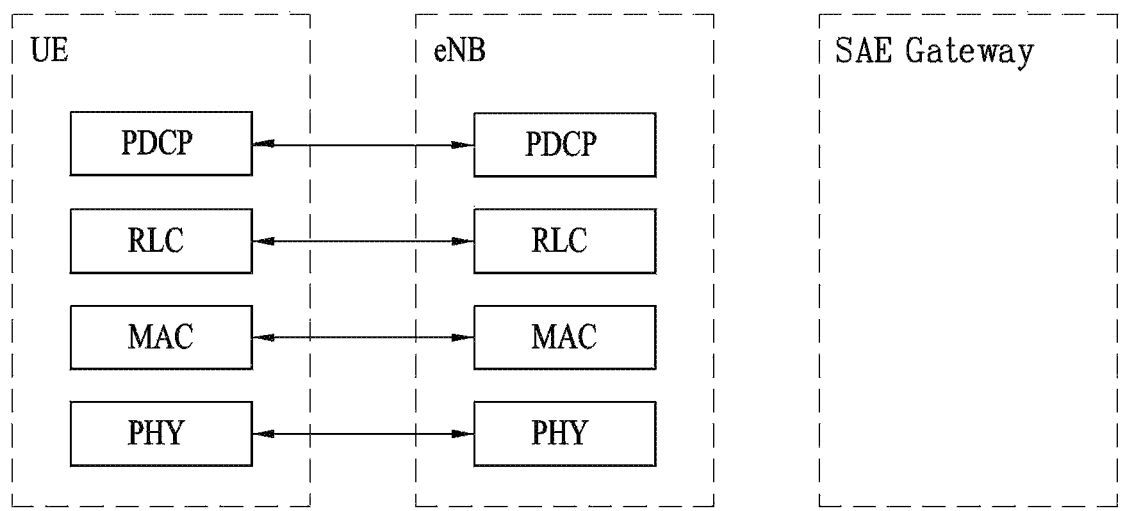
(B) USER-PLANE PROTOCOL STACK (A)   (B)

FIG. 12
(a)
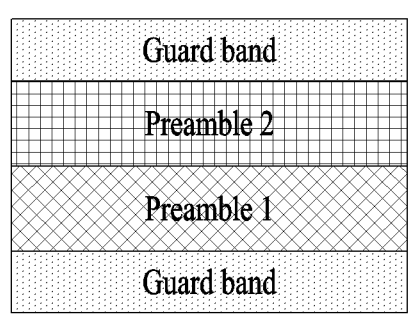
(b)
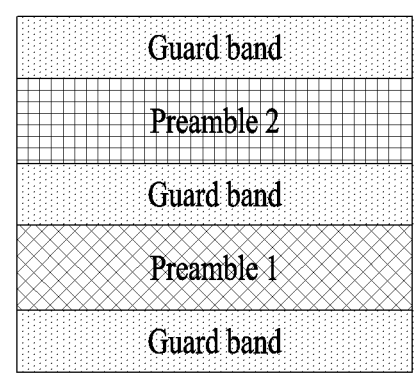
(c)
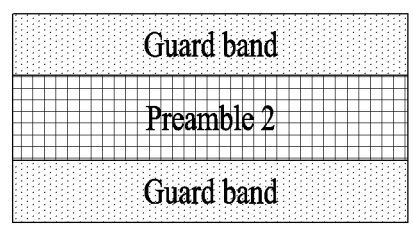
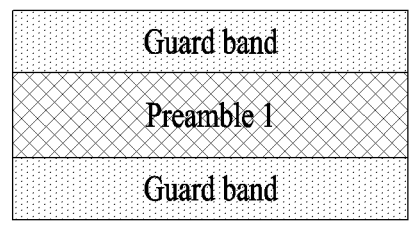
(d)

METHOD FOR PERFORMING RANDOM ACCESS PROCEDURE IN NEXT GENERATION WIRELESS COMMUNICATION SYSTEM AND APPARATUS THEREFOR

TECHNICAL FIELD

The present invention relates to a next generation wireless communication system, and more particularly, to a method of performing a random access procedure in a next generation wireless communication system and apparatus therefor.

BACKGROUND ART

As an example of a wireless communication system to which the present invention is applicable, a 3rd Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQuest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE OF THE INVENTION

Technical Task

Based on the aforementioned discussion, the technical task of the present invention is to propose a method of performing a random access procedure in a next generation wireless communication system and apparatus therefor.

Technical Solutions

In one technical aspect of the present invention, provided herein is a method of performing a random access procedure by a user equipment in a wireless communication system, the method including transmitting a plurality of random access signals corresponding to a plurality of different beams to a base station in a transmission interval corresponding to the corresponding random access signal, receiving a random access response signal corresponding to a prescribed random access signal among a plurality of the random access signals, and transceiving a signal with the base station using a beam corresponding to the prescribed random access signal, wherein a plurality of the random access signals include identifier information of the user equipment.

In another technical aspect of the present invention, provided herein is a user equipment in a wireless communication system, the user equipment including a wireless communication module and a processor connected to the wireless communication module, the processor configured to transmit a plurality of random access signals corresponding to a plurality of different beams to a base station in a transmission interval corresponding to the corresponding random access signal, receive a random access response signal corresponding to a prescribed random access signal among a plurality of the random access signals, and transceive a signal with the base station using a beam corresponding to the prescribed random access signal, wherein a plurality of the random access signals include identifier information of the UE.

Preferably, each of a plurality of the random access signals may include a first random access preamble for uplink synchronization acquisition and a second random access preamble indicating the identifier information. Or, each of a plurality of the random access signals may include a random access preamble for uplink synchronization acquisition and the identifier information.

More preferably, the random access response signal may include the identifier information of the user equipment.

Additionally, the random access response signal may be received in a random access response signal receiving interval corresponding to the prescribed random access signal among a plurality of random access response signal intervals.

Moreover, at least one of an ACK/NACK signal for the random access response signal and a channel state information with the base station may be transmitted using the beam corresponding to the prescribed random access signal.

Advantageous Effects

According to an embodiment of the present invention, a random access procedure can be efficiently performed.

The effects of the present invention are not limited to the above-described effects and other effects which are not described herein will become apparent to those skilled in the art from the following description.

DESCRIPTION OF DRAWINGS

FIG. 2 is a diagram illustrating structures of a control plane and a user plane of a radio interface protocol between a UE and an E-UTRAN based on the 3GPP radio access network specification.

FIG. 12 shows one example of a method of configuring a data part in an RACH signal according to an embodiment B of the present invention.

BEST MODE FOR INVENTION

Figure 1:
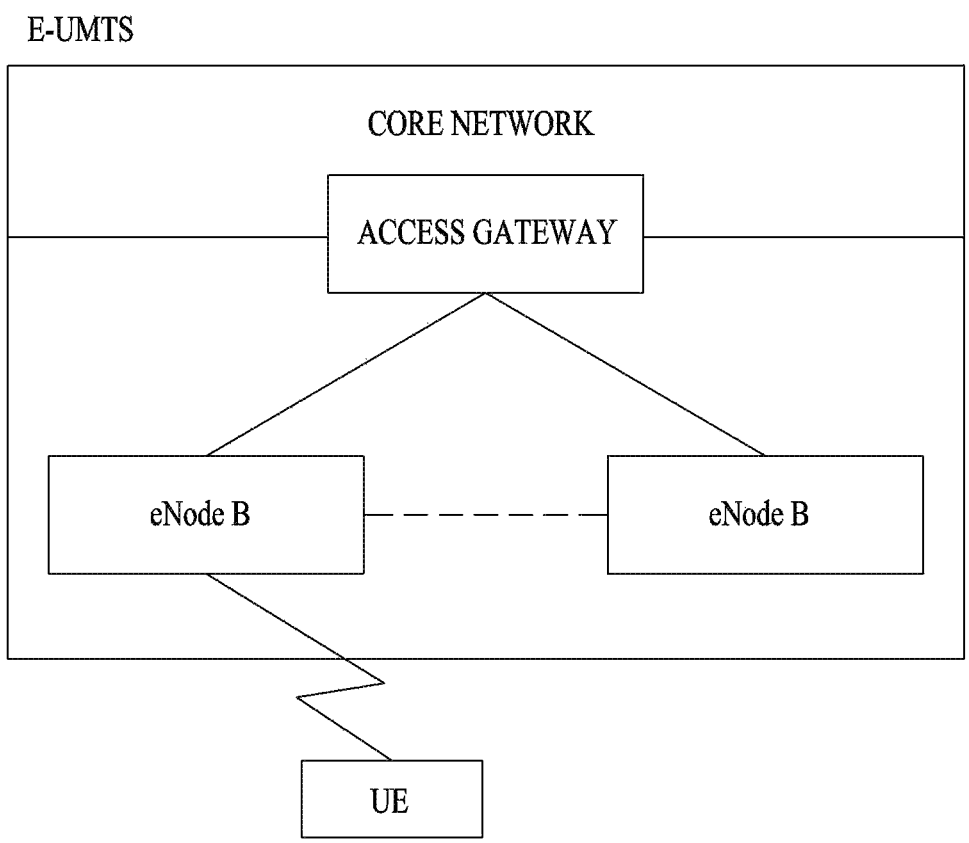
FIG. 1 is a diagram schematically illustrating a network structure of an E-UMTS as an exemplary radio communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constructing an eNB is configured by one of bandwidths among 1.25, 2.5, 5, 10, 15, and 20 MHz and provides DL or UL transmission service to a plurality of UEs. Cells different from each other can be configured to provide a different bandwidth.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
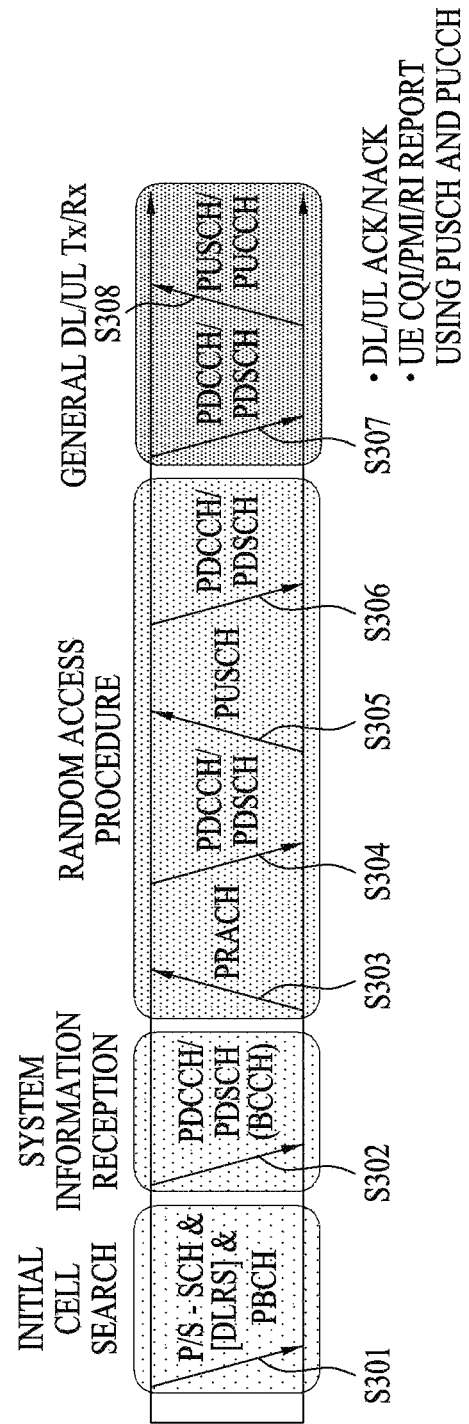
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
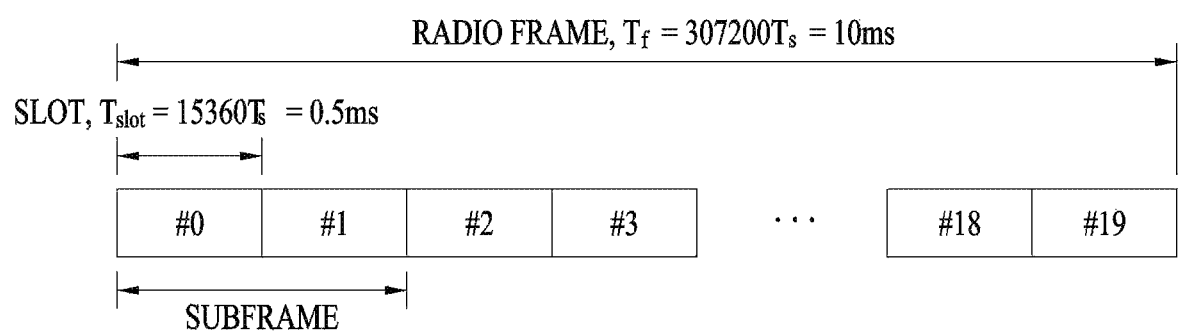
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10$^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
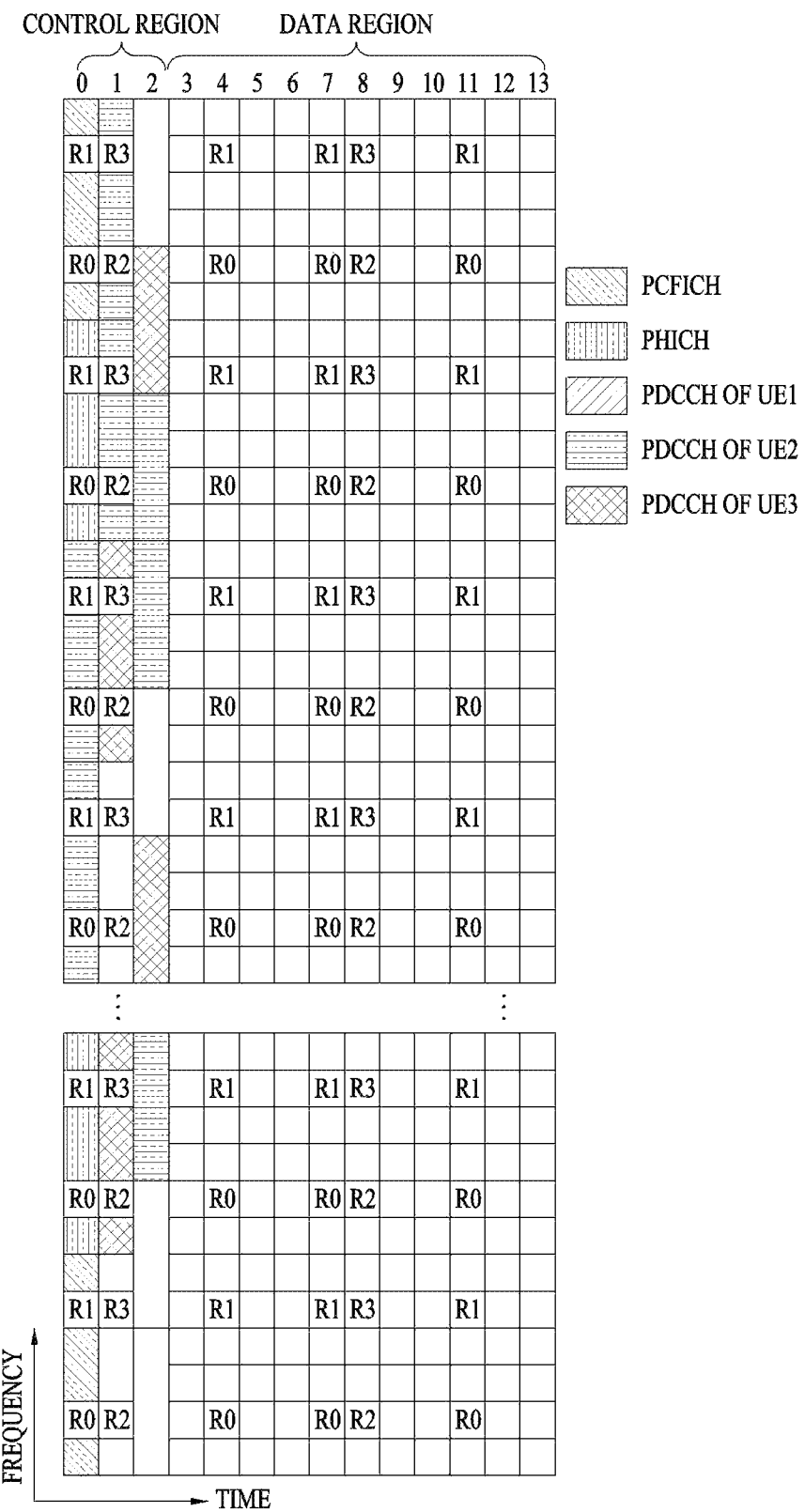
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
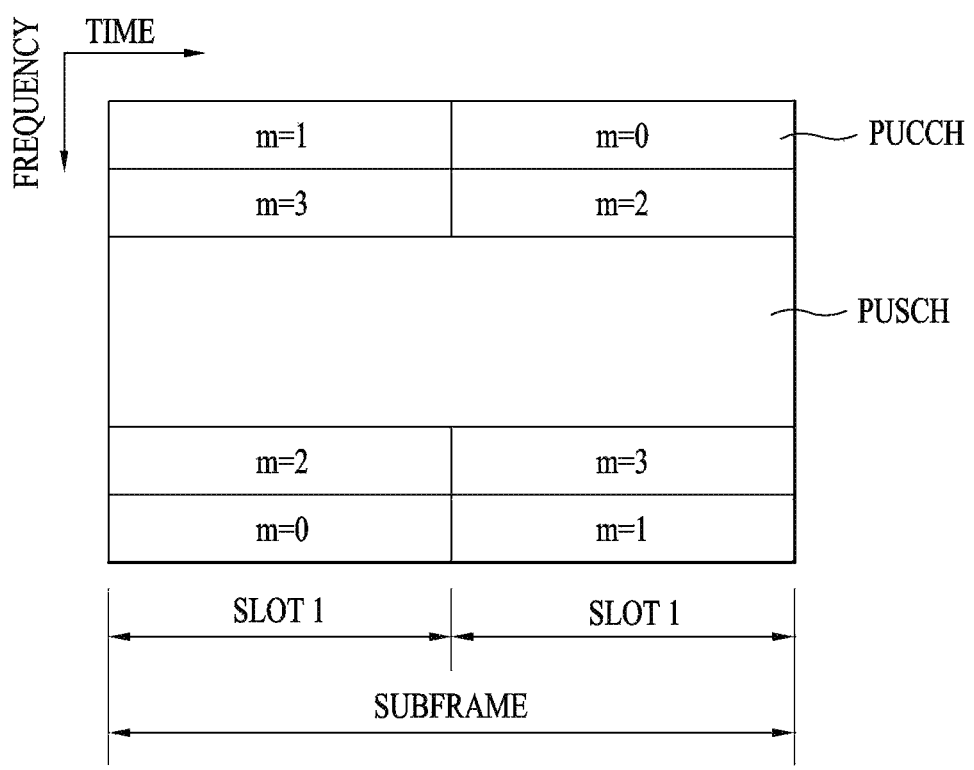
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Next, a random access (RA) procedure provided in an LTE system will be described. The RA procedure provided in the LTE system is divided into a contention based random access procedure and a non-contention based random access procedure. The contention based random access procedure or the non-contention based random access procedure is determined depending on whether a random access preamble used in the RA procedure is directly selected by a UE or is selected by an eNB.

In the non-contention based random access procedure, the UE uses a random access preamble which is directly allocated thereto by the eNB. Accordingly, if the eNB allocates the specific random access preamble only to the UE, the random access preamble is used only by the UE and other UEs do not use the random access preamble. Accordingly, since the random access preamble corresponds one-to-one to the UE which uses the random access preamble, no contention occurs. In this case, since the eNB may become aware of the UE which transmits the random access preamble as soon as the eNB receives the random access preamble, efficiency is good.

In the contention based random access procedure, since a random access preamble is arbitrarily selected from among random access preambles which may be used by the UE and is transmitted, a plurality of UEs may always use the same random access preamble. Accordingly, when the eNB receives a specific random access preamble, the eNB may not check which UE transmits the random access preamble.

The UE performs the random access procedure 1) if a UE performs initial access without RRC connection with an eNB, 2) if a UE first accesses a target cell in a handover process, 3) if a random access procedure is requested by a command of an eNB, 4) if uplink data is generated in a state in which uplink time synchronization is not performed or radio resources to be used to request radio resources are not allocated and 5) upon a restoring process due to radio link failure or handover failure.

Figure 7:
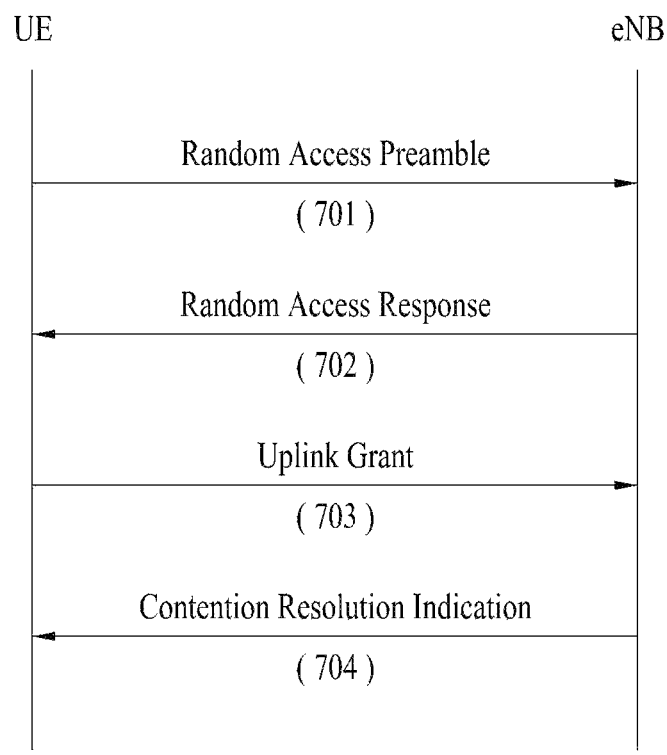
FIG. 7 is a diagram showing operations of a UE and an eNB in a contention based random access procedure provided in an LTE system.

FIG. 7 is a diagram showing operations of a UE and an eNB in a contention based random access procedure provided in an LTE system.

Referring to FIG. 7, in step 701, the UE may randomly select a single random access preamble from a set of random access preambles indicated through system information or a handover command, and select and transmit Physical Random Access Channel (PRACH) resources capable of transmitting the random access preamble. At this time, the preamble is called RACH MSG 1.

In step 702, the UE attempts to receive its own random access response within a random access response reception window indicated by the eNB through the system information or the handover command, after the random access preamble is transmitted. More specifically, RACH MSG 2, that is, random access response information is transmitted in the form of a MAC PDU and the MAC PDU is sent via a PDSCH. In addition, a PDCCH is also sent in order to enable the UE to appropriately receive the information sent via the PDSCH. That is, the PDCCH includes information about the UE which should receive the PDSCH, frequency and time information of radio resources of the PDSCH and the transmission format of the PDSCH. If the UE successfully receives the PDCCH, the random access response transmitted via the PDSCH is appropriately received according to the information about the PDCCH. The random access response includes a random access preamble identity, UL grant, a temporary C-RNTI, a time alignment command, etc. The reason why the random access preamble identity is necessary is because random access response information for one or more UEs may be included in one random access response and thus it is necessary to indicate for which UE the uplink grant, the temporary C-RNTI and the time alignment command are valid. The random access preamble identity matches the random access preamble selected by the UE in step 701.

Subsequently, in step 703, if the UE has received the random access response valid for the UE, the UE processes all information included in the random access response. That is, the UE applies the time alignment command and stores the temporary C-RNTI. In addition, data which is stored in the buffer of the UE or newly generated data is transmitted to the eNB using the uplink grant. At this time, data transmitted via the uplink grant, that is, MAC PDU, is referred to as RACH MSG 3. The identity of the UE should necessarily be included in the data included in the uplink grant. This is because the eNB may not determine which UE performs the random access procedure in the contention based random access procedure and thus should identify the UE in order to perform contention resolution later. Here, there are two different schemes for including the UE identity. A first scheme is to transmit the UE's cell identity through UL grant if the UE has already received a valid cell identity allocated by a corresponding cell prior to the random access procedure. Conversely, the second scheme is to transmit the UE's unique identity if the UE has not received a valid cell identity prior to the random access procedure. In general, the unique identity is longer than the cell identity. If the UE has transmitted data through the UL Grant, the UE starts a contention resolution (CR) timer.

Finally, after the UE transmits the data including its own identity through the UL Grant included in the random access response, the UE waits for an indication from the eNB for contention resolution. That is, the UE attempts to receive the PDCCH in order to receive a specific message. Here, there are two schemes for receiving the PDCCH. As described above, the UE attempts to receive the PDCCH using its own cell identity if the identity transmitted via the UL Grant is a cell identity, and the UE attempts to receive the PDCCH using the temporary C-RNTI included in the random access response if the identity is its own unique identity. Thereafter, in the former scheme, if the PDCCH (that is, RACH MSG 4) has been received through its own cell identity before the contention resolution timer has expired, the UE determines that the random access procedure has been normally performed and completes the random access procedure. In the latter scheme, if the PDCCH has been received through the temporary C-RNTI before the contention resolution timer has expired, the UE checks data transferred by the PDSCH indicated by the PDCCH. If the unique identity of the UE is included in the data, the UE determines that the random access procedure has been normally performed and completes the random access procedure.

Figure 8:
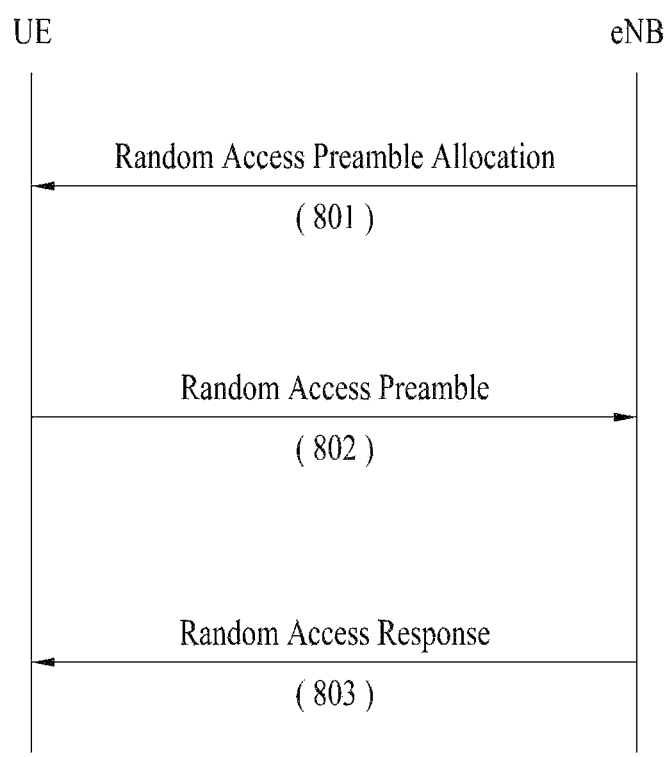
FIG. 8 is a diagram showing operations of a UE and an eNB in a non-contention based random access procedure provided in an LTE system.

FIG. 8 is a diagram showing operations of a UE and an eNB in a non-contention based random access procedure provided in an LTE system.

As described above, in the non-contention based random access procedure, unlike the contention based random access procedure, if the random access response information is received, the UE determines that the random access procedure has been normally performed and completes the random access procedure. In addition, the non-contention random access procedure may be performed upon a handover process or when this procedure is requested by the eNB. Of course, even in these cases, the contention based random access procedure may be performed. First, for the non-contention based random access procedure, it is important to receive, from the eNB, a dedicated random access preamble which may not cause contention. In order to receive the random access preamble, a handover command and a PDCCH command may be used.

In addition, the eNB may set PRACH resources to be used when the UE transmits the random access preamble. The PRACH resources include a subframe and frequency resources to be used when the UE transmits the random access preamble.

Table 1 shows PRACH mask indices of PRACH resources which are set by the eNB with respect to the UE.

TABLE 1

| PRACH Mask Index | Allowed PRACH (FDD) | Allowed PRACH (TDD) |
|---|---|---|
| 0 | All | All |
| 1 | PRACH Resource Index 0 | PRACH Resource Index 0 |
| 2 | PRACH Resource Index 1 | PRACH Resource Index 1 |
| 3 | PRACH Resource Index 2 | PRACH Resource Index 2 |
| 4 | PRACH Resource Index 3 | PRACH Resource Index 3 |
| 5 | PRACH Resource Index 4 | PRACH Resource Index 4 |
| 6 | PRACH Resource Index 5 | PRACH Resource Index 5 |
| 7 | PRACH Resource Index 6 | Reserved |
| 8 | PRACH Resource Index 7 | Reserved |
| 9 | PRACH Resource Index 8 | Reserved |
| 10 | PRACH Resource Index 9 | Reserved |
| 11 | Every, in the time domain, even PRACH opportunity $1^{st}$ PRACH Resource Index in subframe | Every, in the time domain, even PRACH opportunity $1^{st}$ PRACH Resource Index in subframe |
| 12 | Every, in the time domain, odd PRACH opportunity $1^{st}$ PRACH Resource Index in subframe | Every, in the time domain, odd PRACH opportunity $1^{st}$ PRACH Resource Index in subframe |
| 13 | Reserved | $1^{st}$ PRACH Resource Index in subframe |
| 14 | Reserved | $2^{nd}$ PRACH Resource Index in subframe |
| 15 | Reserved | $3^{rd}$ PRACH Resource Index in subframe |

For example, in the FDD mode, the UE may transmit the random access preamble in one subframe or even subframes or odd subframes among 10 subframes according to the PRACH mask indices of Table 1.

Referring to FIG. 8, the UE receives a random access preamble allocated by the eNB in step 801 and transmits the preamble to the eNB in step 802. A method of receiving a random access response in step 803 is equal to that of the contention based random access procedure of FIG. 7.

In some implementations, as a wavelength gets shortened in Millimeter Wave (mmW), a multitude of antenna elements can be installed in the same area. Particularly, as a wavelength on 30-GHz band is 1 cm, total 64 (=8×8) antenna elements can be installed in form of 2D (dimension) array on a 4-by-4 (cm) panel in a manner of being spaced 0.5 lambda (wavelength) apart. Hence, according to the recent tendency in the mmW field, high coverage is increased by raising a BeamForming (BF) gain using a multitude of antenna elements or the increase of throughput is attempted.

In this case, if a Transceiver Unit (TXRU) is prepared to enable transmit power and phase adjustment per antenna element, independent beamforming is possible per frequency resource. Yet, if TXRUs are installed for about 100 antenna elements all, it causes a problem that effectiveness is lowered in price aspect. Hence, considered currently is a scheme of adjusting a direction of a beam with an analog phase shifter by mapping a multitude of antenna elements to a single TXRU. As such an analog beamforming scheme can make a single beam direction only on the total band, it is disadvantageous in that a frequency selective beamforming cannot be performed.

As an intermediate form between digital BF and analog BF, it is able to consider hybrid BF having B TXRUs of which number is smaller than Q that is the number of antenna elements. In this case, although there is a difference depending on a connecting scheme between B TXRUs and Q antenna elements, the number of beam directions capable of simultaneous transmissions is limited to B or less.

Figure 9:
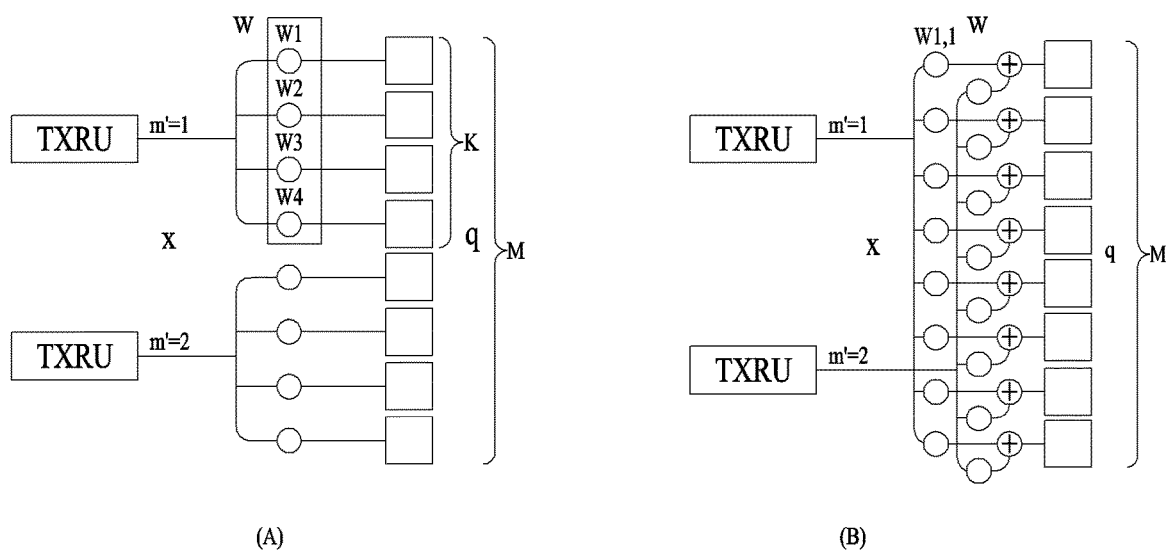
FIG. 9 shows examples of a scheme of connection between a TXRU and an antenna element.

FIG. 9 shows examples of a scheme of connection between a TXRU and an antenna element.

FIG. 9(a) shows a scheme that a TXRU is connected to a subarray. In this case, an antenna element is connected to a single TXRU only. On the other hand, FIG. 9(b) shows a scheme that an antenna element is connected to all TXRUs. In FIG. 9, W indicates a phase vector multiplied by a phase shifter. Namely, a direction of analog beamforming is determined by W. Here, mapping between a CSI-RS antenna port and TXRUs may include 1-to-1 or 1-to-many.

As many communication devices demand larger communication capacity, the necessity for wireless broadband communication improved in comparison with the legacy Radio Access Technology (RAT) is rising. And, massive Machine Type Communications (MTC), which provides various services anytime anywhere by connecting a multitude of devices and things, is one of the major issues that will be considered by the next generation communication as well. Moreover, a communication system design, which considers a service/UE sensitive to reliability and latency, is currently discussed. And, the introduction of the next generation RAT considering such facts is currently discussed, which shall be referred to as NewRAT in the present invention for clarity.

Figure 10:
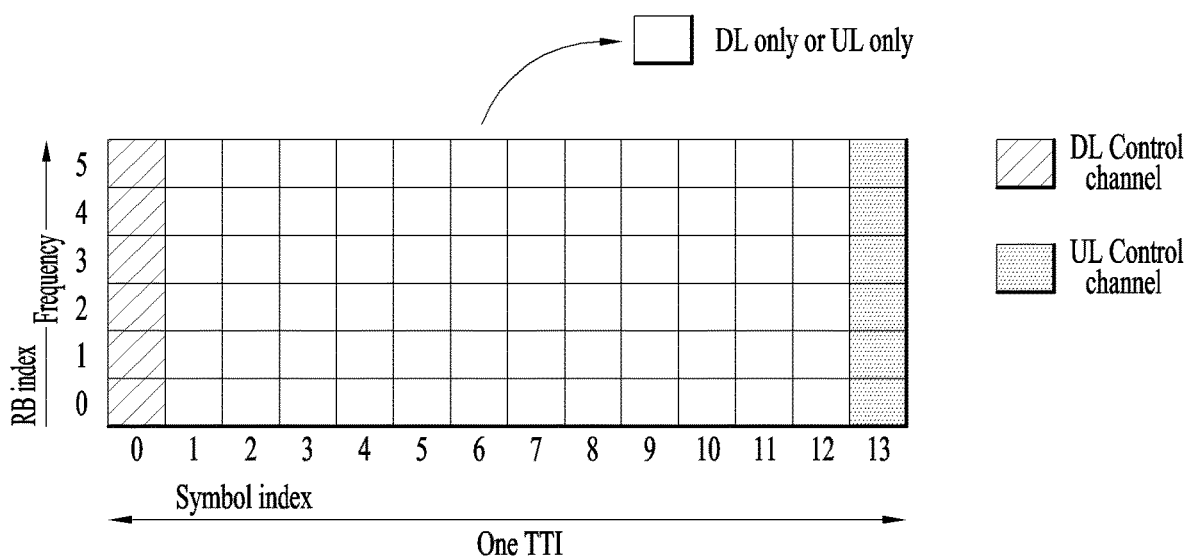
FIG. 10 shows one example of a self-contained subframe structure.

In order to minimize data transmission latency in a TDD system, the 5G NewRAT is considering such a self-contained subframe structure as shown in FIG. 10. FIG. 10 shows one example of a self-contained subframe structure.

In FIG. 10, a slashed region indicates a DownLink (DL) control region and a black part indicates an UpLink (UL) control region. A non-marked region may be used for DL data transmission or UL data transmission. Regarding features of this structure, as a DL transmission and a UL transmission are sequentially progressed in a single subframe, DL data may be sent in a subframe or UL ACK/NACK may be received in a subframe. Eventually, it is able to reduce a time taken to data retransmission in case of occurrence of data transmission error, whereby latency of final data forwarding can be minimized.

In such a self-contained subframe structure, a time gap for a process for a base station and UE to switch from a transmitting (Tx) mode to a receiving (Rx) mode or from an Rx mode to a Tx mode is necessary. To this end, some OFDM Symbol (OS) at a Downlink-to-Uplink (DL-to-UL) switching timing in a self-contained subframe structure is configured as a Guard Period (GP).

For one example of a self-contained subframe type configurable/settable in a NewRAT based operating system, at least 4 kinds of subframe type can be considered as follows.
DL control interval+DL data interval+GP+UL control interval
DL control interval+DL data interval
DL control interval+GP+UL data interval+UL control interval
DL control interval+GP+UL data interval Meanwhile, in a next generation wireless communication system, it may consider a situation of introducing a sharp beamforming scheme such as analog beamforming and the like for Downlink/Uplink (DL/UL) using a multitude of antennas. In this case, the corresponding beamforming may assume a case of changing according to a time. For example, a beam direction in a subframe #n may be different from that in a subframe #m in general, and a signal transmitted/received in a different beam direction may be assumed as an almost negligible level due to signal attenuation and the like. In this situation, in case of UL, it is preferable that UEs in a situation suitable for a beam direction A (e.g., a situation of high transmission efficiency in a corresponding beam direction, or a situation of high reception/detection probability strength in eNB aspect) transmit signals at a timing corresponding to the beam direction A. In case of transmitting a signal at a timing corresponding to a beam direction B, it may means that an eNB is unable to receive/detect a signal transmitted by a corresponding UE or that an Rx power of the signal is lowered under a specific level.

In the next generation wireless communication system, a plurality of beam directions may exist. And, the number of UEs suitable for the same beam may be assumed as rapidly decreasing in comparison with the legacy LTE system environment. In case of transmitting PRACH for the purpose of matching UL synchronization for a specific UE in an initial access or an RRC CONNECTED/RRC IDLE mode or the like, a situation/probability that a UE corresponding to the same beam collides on the same resource may be assumed as rapidly decreasing.

As a method of schematizing the above-described random access procedure in the next generation wireless communication system, the present invention proposes a method of simultaneously transmitting PRACH and specific data. Moreover, the present invention proposes a method of performing a schematized random access procedure using a PRACH transmission of the corresponding scheme. For clarity of description, PRACH of the LTE system is taken as one example. Yet, the present invention is non-limited by the LTE system. And, it is obvious that the present invention is extensible to physical channels that can be referred to as other names in other Radio Access Technologies (RATs). And, assumption for an analog beam is non-limited by one of a case of a presence of a single beam at a specific timing and a case of a presence of a plurality of beams at a specific timing.

In the next generation wireless communication system, various services (e.g., such an environment having a different performance requirement as eMBB, mMTC, URLLC, etc.) may be supported. Moreover, in the next generation wireless communication system, a case of a different numerology (e.g., a case of a different subcarrier spacing or a different TTI length, a case of a different band (e.g., above 6 GHz or below 6 GHz) to which an operation carrier frequency belongs, etc.) may be supported as well.

A PRACH preamble format (e.g., a combination of lengths and configurations of Cyclic Prefix (CP), preamble sequence, Guard Time (GT) and data, and/or a subcarrier spacing on PRACH transmission, etc.) and/or a random access procedure type (e.g., a procedure scheme for PRACH, RAR, Msg3 and Msg4, a procedure scheme for PRACH, RAR and Msg3 including data, etc.) may be configured differently or independently.

More typically, a PRACH preamble format and/or a random access procedure type may be configured in a single or separate configuration form by a higher layer (e.g., System Information Block (SIB) x). Alternatively, a PRACH preamble format and/or a random access procedure type may be configured implicitly according to an operation service and/or numerology.

For a detailed example, in case that a symbol duration becomes short, a preamble format corresponding to a short coverage (e.g., having a relatively short PRACH preamble transmission interval) may be selected. In case that a symbol duration is relatively long, a preamble format corresponding to a wide coverage (e.g., having a relatively long PRACH preamble transmission interval) may be selected. The change of the symbol duration may related to data (e.g., PDSCH/PUSCH), and more particularly, to a change of a subcarrier spacing.

For example, a situation of elongating a symbol duration may correspond to a situation of decreasing a subcarrier spacing. On the contrary, a situation of shortening a symbol duration may correspond to a situation of increasing a subcarrier spacing. In this case, in proportion to a corresponding subcarrier spacing increase/decrease, a subcarrier spacing for PRACH may increase/decrease. Particularly, it is able to consider that a BW proportionally increases according to the PRACH preamble transmission interval change. In this case, it may be advantageous in that a preamble sequence is usable identically.

Alternatively, although a PRACH preamble transmission interval is changed, a BW may be maintained intact or configured on a similar level (e.g., a difference equal to or smaller than a predetermined threshold). In this case, by reducing multiplexing capacity in a manner of considering that a general UE distribution number is changed according to coverage, overhead may be reduced advantageously.

Additionally, a random access procedure type may be configured differently in case of eMBB or URLLC. Particularly, eMBB may operate by a procedure for PRACH, RAR, Msg3 and Msg4, and URLLC may operate by a random access procedure of a latency reduced type like a procedure for PRACH, RAT and Msg3 including data.

<RACH Signal Design>

A basic RACH signal may include a first Cyclic Prefix (CP) and/or a preamble sequence and/or a second CP and/or a data part and/or a Guard Time (GT). The above components may be TDMed or consider being FDMed in part.

In order to meet a target cell radius for a corresponding serving cell, the GT may consider a propagation delay corresponding to the target cell radius. For example, the GT may be configured to be equal to or greater than a Round-Trip Time (RTT) for the target cell radius. For example, since a Guard Period (GP), which considers a frame structure in the next generation wireless communication system as a self-contained type having DL and UL mixed in a single subframe like FIG. 10, may include 1 symbol or 2 symbols, a GT may correspond to 1 symbol duration (i.e., 14.28 us) or 2 symbol durations (i.e., 28.56 us). Here, the Guard Period (GP) may include a space between DL and UL and mean an interval reserved to apply a Timing Advance (TA) in case of UL transmission.

The first CP is provided to meet a target propagation delay and a target delay spread as an RACH signal is initially transmitted at a specific reference timing (e.g., a subframe boundary according to DL synchronization or a timing at which a TA is assumed as 0, etc.). Hence, a length of the first CP may be equal to a GT (i.e., 14.28 us or 28.56 us) or a result (e.g., 15.21 us or 29.48 us) from adding a CP length of a unicast reference to a length of a GT. The preamble sequence is used in estimating UL synchronization by being received from an eNB end and may be configured to utilize a specific sequence structure such as Zhadoff-Chu (ZC) sequence or CAZAK sequence.

Particularly, the first CP may be configured to copy a portion of a preamble like an end portion of a preamble sequence. A subcarrier spacing for a preamble sequence part may be set different from that of a general UL transmission such as PUCCH or PUSCH, and a corresponding value may be set smaller than that. For example, if a subcarrier spacing for a general UL transmission is 75 kHz, a subcarrier spacing in case of a preamble sequence transmission may include 7.5 kHz, 12.5 kHz, 15 kHz, 30 kHz, 37.5 kHz, 60 kHz, 75 kHz, 120 kHz, 240 kHz, or the like. Or, by limiting a target cell radius, a subcarrier spacing may be set to 75 kHz equal to that of other UL transmission. Particularly, in case of a preamble sequence transmission, there may exist a plurality of subcarrier spacings. In this case, a subcarrier spacing to be used may be signaled by a higher layer (e.g., SIB) or configured as a PRACH preamble format type.

Moreover, a subcarrier spacing (set) used for a preamble transmission may be configured differently according to a PRACH transmitted carrier frequency. For example, if a carrier frequency is smaller than 6 GHz, 1.25 kHz may be included to support a cell radius of at least 100 km. Additionally, there may exist a format that enables the same subcarrier spacing as other UL transmission. If a carrier frequency is equal to or greater than 6 GHz, it may support a subcarrier spacing (e.g., 75 kHz) of a relatively large value for a preamble.

If a subcarrier spacing for an RACH preamble is set equal to that of another UL transport channel, a maximum CP length for PRACH may include the reciprocal of a subcarrier spacing, i.e., a value resulting from excluding a CP length from a data symbol duration. Considering that a reference time unit such as a slot, a subframe or a beam sweeping unit is changed according to a subcarrier spacing, the number of symbols that can enter a reference time unit except CP may be limited to total N (e.g., 15) that is a specific value. Moreover, an xPRACH resource may be configured in a manner that each symbol is set as xPRACH CP, xPRACH preamble sequence or xPRACH GT. Moreover, in order to secure coverage, it may be able to consider a configuration of repeating a prescribed preamble sequence part.

An example of xPRACH is described in detail as follows. For clarity of the following description, a CP, a PR and a GT may indicate an xPRACH CP, an XPRACH preamble sequence and an xPRACH GT, respectively. Moreover, for clarity of the description, the number 'N' of symbols that can enter the reference time unit is assumed as 15.

First Example

As 15 symbols are configured in form of CP/PR/PR/PR/PR/CP/PR/PR/PR/PR/CP/PR/PR/PR/PR, 3 xPRACH resources may exist within a basic time unit and a repetitive gain may be obtained through each PR repetition. As another combination, 15 symbols may be configured in form of CP/PR/PR/CP/PR/PR/CP/PR/PR/CP/PR/PR/CP/PR/PR. According to this scheme, since a GT is not separately set, there may exist scheduling restriction on a corresponding frequency region for a data channel transmitted after a corresponding basic time unit (e.g., subframe).

More generally, a plurality of PRACH resources may exist within a reference time unit, and a plurality of preambles may be repetitively configured per single CP. Moreover, a GT may not exist within a reference time. Each PRACH resource may assume the same beam pattern/information or a different or independent beam pattern/information.

Second Example

As 15 symbols are configured in form of CP/PR/PR/PR/PR/PR/PR/CP/PR/PR/PR/PR/PR/PR/GT, 2 xPRACH resources may exist within a basic time unit. Since a GT exists separately, other UL channel can be scheduled after a corresponding basic time unit without restriction.

More generally, a plurality of PRACH resources may exist within a reference time unit, and a plurality of preambles may be repetitively configured per single CP. Typically, a GT in a reference time may exist within a reference time unit. Particularly, a GT may be located last within a reference time unit. Each PRACH resource may assume the same beam pattern/information or a different or independent beam pattern/information.

Third Example

As 15 symbols are configured in form of CP/PR/CP/PR/CP/PR/CP/PR/CP/PR/CP/PR/CP/PR/GT, 7 xPRACH resources may exist within a basic time unit. Since a PR is not repeated, CP/PR unit or xPRACH resource unit may be repeated to obtain a repetition gain. Particularly, the third example may be understood as a structure for beam sweeping for a narrow beamforming.

If the present example is further generalized for description, a plurality of PRACH resources may exist within a reference time unit, and a single preamble may be configured per single CP. Typically, a GT in a reference time may exist within a corresponding interval or not, depending on a length of a reference time unit. Particularly, if a GT exists, it may be located at a last part within a reference time unit. Each PRACH resource may assume the same beam pattern/information or a different or independent beam pattern/information.

Fourth Example

Finally, as 15 symbols are configured in form of CP/PR/PR/PR/ . . . /PR/PR/GT, 1 xPRACH resource may exist within a basic time unit. Particularly, it may be utilized for a case that PR repetition is extremely necessary.

Meanwhile, in a next generation wireless communication system, as a part of obtaining or maximizing a beam gain, a beam sweeping process for attempting transmission/reception by assuming a plurality of beam patterns during a plurality of time resources may be performed. In this case, beam information may be changed per single or a plurality of PRACH preamble basic units (i.e., a unit configured with a CP and a single PR or a plurality of PRs) in case of PRACH transmission.

Depending on a type and/or numerology (e.g., subcarrier spacing and/or TTI length and/or carrier frequency, etc.) of a service supported or operated by a serving cell, a type of a beam, the number of beams and a corresponding beam sweeping interval may differ. For a specific scenario, a single beam based operation may be supported. Regarding configuration for the above-described single or a plurality of beams, the scalable (i.e., determining according to the number of beams) may be advantageous in aspect of resource management and the like. Basically, an eNB may configure a beam sweeping interval and/or a PRACH transmission basic unit interval and/or the number of beam patterns and the lie through a higher layer (e.g., SIB) (for PRACH transmission at least) and signal such configuration to a UE. Based on such information, the UE may scalably adjust a single beam operation and a multi-beam operation, and more particularly, the number of beam informations and the like in the multi-beam operation.

For example, a UE can determine/assume an operation scheme by comparing values of a beam sweeping interval and a PRACH transmission basic unit interval. For example, if a length of a beam sweeping interval is equal to or smaller than a length of a PRACH transmission basic unit interval, a PRACH transmission can be assumed as operating based on a single beam. On the contrary, if a length of a beam sweeping interval is greater than a length of a PRACH transmission basic unit interval, a PRACH transmission can be assumed as operating based on multiple beams. More typically, a beam information or pattern may be implicitly determined according to the number of PRACH transmission basic units in a beam sweeping interval.

Therefore, the present invention proposes to transmit data together with a preamble sequence in transmitting an RACH signal. For example, a form of data may be similar to that of a PUSCH transmission for unicast or that of a preamble transmission. Regarding the advantage of the present scheme, in case of transmitting contention resolution information as data from an RACH signal end for example, the corresponding contention resolution information is transmitted again as a Random Access Response (RAR), thereby leaving room for simplifying a random access procedure.

Particularly, a second CP may be configured in a manner of copying a prescribed portion of data (e.g., assuming that an end portion of a data part or the data part is configured with several symbols, an end portion of a first symbol or a plurality of first symbols). Moreover, a length of the second CP may be set equal to a length of a first CP, a length of a GR, or a length of a symbol CP for general unicast PUSCH. If a length of the second CP is elongated, it may cause a problem that total CP overhead may increase. Yet, when different UEs transmit PRACH on different (frequency) resources, respectively, although there is a difference in propagation delay, an eNB receiving end can advantageously perform signal/data detection using a single FFT module.

On the other hand, in case that an FFT module can be separately configured per resource, it is able to set a symbol CP length for general PUSCH for the purpose of preventing a delay spread toward a data part from a preamble. Although a subcarrier spacing for a data part may be set equal to that of a preamble part, the subcarrier spacing for the preamble part and the subcarrier spacing for the data part may be set/designated independently from each other. For example, in case of a data part, a subcarrier spacing may be set to 75 kHz so as to be equal to a subcarrier spacing of a general UL.

A data part setting method is described in detail as follows. For clarity of description, although data is represented as contention resolution information/contention resolution ID, it is obviously applicable from the present invention to other information transmissions. In a next generation wireless communication system, a plurality of frequency resources may exist at an RACH signal transmission timing, and RACH signal transmission between different UEs may be FDMed in a manner that at least a UE transmits the frequency resource randomly or according to an eNB instruction, e.g., a PDCCH order. Additionally, it may be able to consider CDM between different RACH signals according to a data transmitting method settings as follows.

In aspect of reception strength of an RACH signal, it may be preferable that a beam direction for a preamble transmission part and a beam direction for a data part are equal to each other. Here, the beam direction may include information on a Tx beam transmitted by a UE or information on an Rx beam received by an eNB. In case of an Rx beam direction, Rx beam information is not changed in each of a preamble part and a data part during an interval in which at least an eNB transmits an RACH signal. In this case, a beam change unit for a signal or channel like a PSS/SSS, which is referred to when information on a beam is estimated, may be different from a beam change unit for an RACH and mutually associated relation may be configured by a higher layer (e.g., SIB).

If an RACH signal basic transmission unit is greater than an Rx beam change unit time at an eNB end, an interleaving or transforming process may be included so that the same channel or effective Rx beam direction is configured for a preamble part and a data part in case of RACH signal transmission. For example of the interleaving or transforming, such a transforming procedure as DFT may be performed additionally. In case that a UE performs a transmission of an RACH signal for a plurality of (Rx) beam informations, it may perform a power control for the RACH signal according to each beam information or each resource set corresponding to the beam information. For example, regarding a transmit power for an RACH signal, a beam relevant offset designated in advance or configured by a higher layer may be included or an offset provided per beam information by a higher layer may be configured independently.

Embodiments of a data transmitting method in an RACH signal according to the present invention are described as follows.

Embodiment A

According to an embodiment A of the present invention, a data part may be configured with single or a plurality of (OPFDM) symbols. In case of the configuration with a plurality of symbols, a CP may exist per symbol.

A CP for a corresponding symbol may have the same length as a symbol CP for PUSCH for the purpose of unicast transmission or be set to the same length as a second CP. Typically, there is no additional CP for a first symbol of a data part and a second CP may be used. A frequency axis may correspond to a frequency region assigned to a single RACH signal transmission, the frequency region assigned to the RACH signal transmission may include a guard band, and the guard band may be identically applied to the data part as well without considering the guard band.

Figure 11:
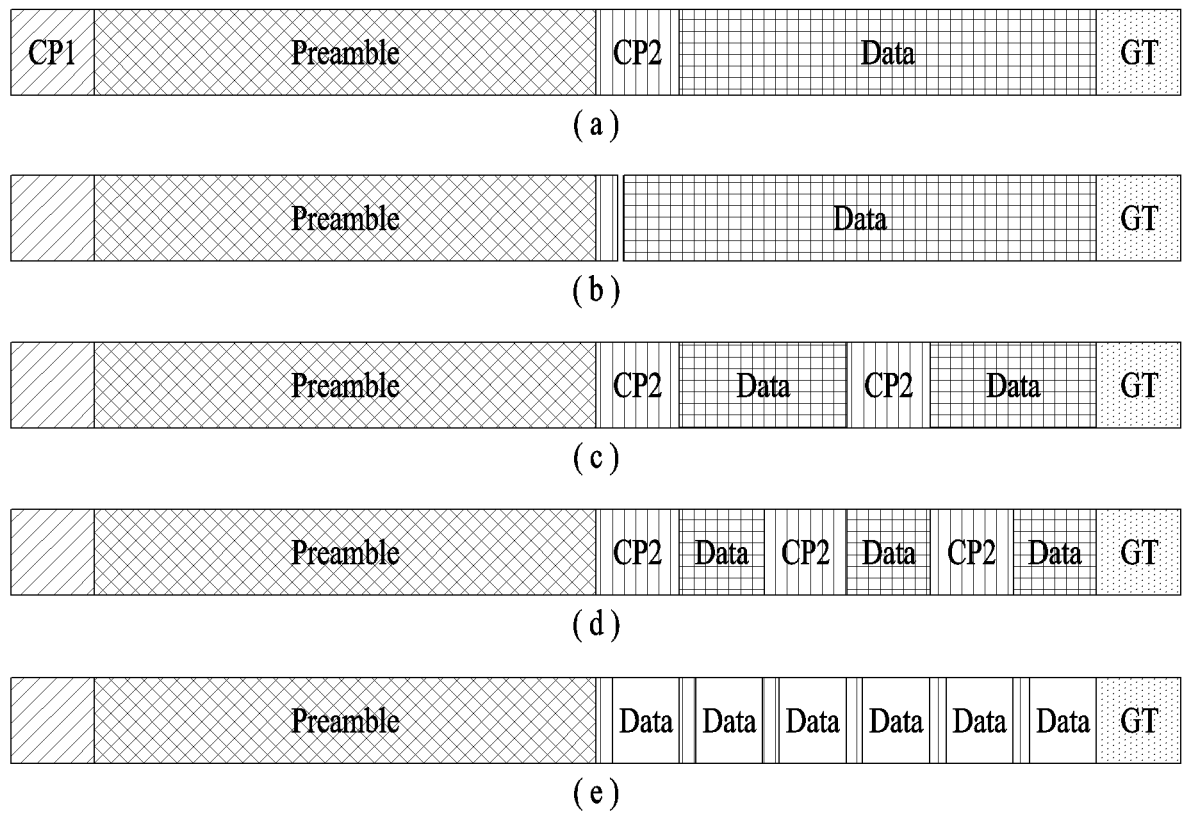
FIG. 11 shows one example of a method of configuring a data part in an RACH signal according to an embodiment A of the present invention.

FIG. 11 shows one example of a method of configuring a data part in an RACH signal according to an embodiment A of the present invention.

In FIG. 11, a rate or range occupied by each of a preamble transmission part and a data part are just exemplary. In case that the data part has a relatively large area, and vice versa, it can be obviously extended from the idea of the present invention. And, the sequence between a preamble transmission and a data part transmission can be changed.

Basically, in case that a length of a second CP is designed by targeting a delay spread only (0.94 us, corresponding to (b) and (d) in FIG. 11), an eNB may complete UL synchronization by receiving/detecting a first CP and a preamble and then attempt a direction of data by shifting a UL (subframe) boundary based on the corresponding information. In case of this scheme, if a plurality of frequency resources exist for an RACH signal transmission usage at the same timing, it may perform a reception/detection procedure (e.g., changing a UL boundary, performing FFT, and then decoding) per UE or frequency resource.

On the other hand, if a length of a second CP is set by considering a propagation delay (and a delay spread), the length of the second CP may be equal to that of a GT or a first CP. In this case, in receiving/detecting a data part at an eNB end, a process for changing a UL boundary according to UL synchronization may not be necessary and it may be possible to perform a single reception/detection procedure (e.g., FFT) on a plurality of frequency resources for an RACH signal transmission usage. In case of FIG. 11(d), for the purpose of matching a data symbol duration to a symbol duration of unicast PUSCH typically, a PUSCH symbol duration may be further added.

Although a preamble transmission part and a data part transmission part are described as TDMed for clarity of the description, this is just exemplary. And, a mutually FDMed form may be considered as well. For example, a frequency resource to which a preamble will be mapped and a frequency resource on which a data part will be transmitted are configured independently (separately) at an FFT front end, an FFT is performed through a single FFT module or a separate FFT module according to each subcarrier spacing, and a first CP and a GT may be then added in common. In this case, an eNB may detect UL synchronization through a preamble from an independently configured frequency resource and also detect additional information such as contention resolution ID from data.

Particularly, a frequency resource for a preamble transmission and a frequency resource for a data transmission may be: (1) adjacent to each other by including or excluding a guard band; or (2) configured separately by a higher layer or as a pair.

Data may basically perform the same process as unicast PUSCH. For example, an information bit of data may perform a process such as CRC attachment and/or code block segmentation, and/or channel coding (e.g., RM coding, TBCC, turbo coding, LDPC coding, etc.), and/or a scrambling process, and/or a modulating process, and/or layer mapping, and/or precoding, and/or mapping to a physical layer resource, etc. Typically, since an eNB and a UE may not be in a state of having exchanged information such as C-RNTI in case of performing an initial access, RNTI may not be considered for a scrambling process and/or a CRC masking. Namely, for a scrambling, a sequence generated from using PCID as a parameter may be used but a CRC masking may not be performed. For an initial access at least, RNTI for a data part may be assumed as 0.

Alternatively, it is able to consider introducing a third RNTI. And, the corresponding RNTI may configure a resource for an RACH signal as information on a parameter and/or beam. Typically, the third RNTI may be configured per resource and/or beam (combination) for an RACH signal through a higher layer signal such as SIB or the like. And, the resource for the TACH signal may be configured with a time domain and/or a frequency domain and/or a preamble index. Moreover, a specific RNTI such as a temporary C-RNTI is used to associate an RACH signal and data, which is associated with the RACH signal, with each other through scrambling and/or CRC masking of a data part.

If the shortage of RNTI candidate values is estimated, RNTI may be assigned for a partial region of an RACH resource. For example, RNTI to be used for a data part of RACH may be designated for a preamble index only among resources for an RACH signal. In this case, the same RNTI may be allowed to be configured in different time/frequency resources. Here, information on a beam may include information on a beam suitable for transmission and/or reception estimated from DL measurement by a UE. Typically, in case that C-RNTI was successfully exchanged already, scrambling and/or CRC masking may be performed using C-RNTI and/or information on a beam.

Embodiment B

A data part may be transmitted in form of a preamble. In case of contention resolution ID for example of data, a probability that UEs suitable for the same beam attempt RACH signal transmission on the same resource can be assumed as lower than a predetermined level. In this case, the maximum number of collision UEs becoming the target of contention resolution can be assumed as remarkably lower than that in the legacy LTE system. By differently configuring a preamble transmission type corresponding to a data part according to a data value, data may be transmitted. And, an eNB receiving end may detect data according to the corresponding preamble transmission type.

For example, if a corresponding preamble is a ZC sequence, a root index and/or Cyclic Shift (CS) value of the ZC sequence may be different according to a data value. Namely, an eNB may estimate a value of data again according to a preamble sequence for a received/detected data part. The above method is advantageous in that CDM among several UEs can be supported for a data part. Even if data transmission is a preamble type, a preamble transmission part and a data transmission part may be mutually TDMed or FDMed. In the above description, FDM may perform preamble mapping for the purpose of UL synchronization and preamble mapping for the purpose of data transmission on frequency resources configured differently or independently at an FFT front end. Thereafter, a first CP and a GT may be added thereto in common.

Typically, a frequency resource for preamble transmission and a frequency resource for data transmission may be: (1) adjacent by including or excluding a guard band; or (2) configured separately by a higher layer or as a pair.

FIG. 12 shows one example of a method of configuring a data part in an RACH signal according to an embodiment B of the present invention. Particularly, a preamble structure for a data part may have the same configuration (e.g., a sequence type and length and/or a CS unit) as a preamble structure for UL synchronization, and be independently configured for each of them.

In FIG. 12, a rate or range occupied by each of a preamble transmission part (preamble 1) and a data part (preamble 2) are just exemplary. In case that the data part has a relatively large area, and vice versa, it can be obviously extended from the idea of the present invention. And, the sequence between a preamble transmission and a data part transmission can be changed obviously.

For the preamble 1 and the preamble 2, information on a subcarrier spacing and a preamble sequence, e.g., a root index and/or a CS unit and/or a high speed flag and/or a sequence index and the like may be configured equally or independently. According to the independent configuration, such information may be configured for each of the preamble 1 (i.e., a UL synchronization preamble) and the preamble 2 (i.e., a data part) by a higher layer such as SIB, or configured as a list or pair.

For example of a detailed operation, different UEs can select a frequency resource randomly in transmitting an RACH signal and map a preamble 1 and a preamble 2 using another frequency resource designated as a match by a higher layer in advance. Moreover, a sequence selection for each preamble may occur randomly. At an eNB receiving end, a detection of the preamble 1 and a detection of the preamble 2 may be separately performed. In this case, a MAC RAR is classified with reference to one preamble (when a plurality of RARs are transmitted on a single PDSCH, utilized as an ID for classifying them), or it may be used for contention resolution with reference to the other preamble (a contention resolution ID is extracted and then transmitted as a part of contents in case of RAR transmission).

Alternatively, it may be used in classifying a MAC RAR for a preamble pair. In this case, a contention resolution process may not exist separately. Yet, a basic size of an ID (e.g., RAPID) for classifying a plurality of RARs transmitted on a single PDSCH may be increased. At an eNB receiving end, collision will occur between UEs identically transmitted all for all preambles, which may leave room for lowering a collision probability in comparison with a case of using a single preamble (amounting to a length resulting from adding two preambles).

For example, when a single sequence having a preamble length '8' is used, a collision probability with 8 candidates is $1/8$. When 2 sequences having a preamble length '4' each are used, a collision probability with 4 candidates each may be lowered to $1/16$. Typically, it is able to consider introducing a frequency resource set. Even if 2 preambles are transmitted by being FDMed, frequency resources more than 2 (e.g., 4 frequency resources) may be allocated (through higher layer signaling) as well.

A frequency resource for an actual preamble transmission may be selected in detail from a given set (randomly selected), and the selected frequency resource may be utilized for data transmission as well. For example, additional information may be forwarded from an eNB depending on whether a preamble is transmitted at (f1, f2) or (f3, f4). The f1, f2, f3 and f4 are resources in the same frequency set, may be configured in advance or by a higher layer, and the selection may be made by a UE randomly.

Embodiment C

A UE may transmit a single preamble. The corresponding preamble may be repeated to secure coverage. A CS and/or root index for a preamble may be linked to data, and a preamble index may be selected differently depending on a data value. Particularly, it is able to consider setting up a group configured with a plurality of preamble indexes according to a data value.

First of all, a preamble index group is selected according to a data value a UE intends to send at a timing of transmitting PRACH, and a specific preamble index may be transmitted by being (randomly) selected from the corresponding selected group. A preamble index group configuring method according to data may be configured in advance (e.g., dividing a preamble index equally according to a module value for a contention resolution ID). Or, when a setting value for PRACH is configured by a higher layer, information on a group may be signaled together as well.

<Random Access Procedure>

A random access procedure according to the present is described as follows. For clarity, data simultaneously transmitted with an RACH signal or data transmitted by being included in an RACH signal is assumed as a contention resolution ID. Data may include data transmitted in form similar to PUSCH and/or data transmitted in form of a preamble and/or information by frequency resource selection.

In the legacy LTE system, PRACH is transmitted. Having received the PRACH, an eNB transmits an RAR containing a TA and a temporary C-RNTI. Having received the RAR, a UE transmits Msg3 to the eNB based on information received through the RAR. In case of an initial access, the UE transmits a contention resolution ID. The eNB sends Msg4 scrambled with the temporary C-RNTI to the UE. By transmitting the contention resolution ID received through the Msg3, the contention resolution is performed at the eNB end. Namely, the initial access is performed through 4 steps by starting with the PRACH transmission.

In a next generation wireless communication system, as a suitable beam varies along a time owing to the analog beam introduction, latency reduction can be emphasized in case of an initial access. For example, as an Rx beam pattern of an eNB varies along a time, an RACH signal may wait for a transmission of a suitable beam or secure successful detection at a timing corresponding to the suitable beam. This may correspond to all physical channel transmissions across the overall random access procedure. Namely, as a procedure gets longer, a time of waiting for a suitable beam may be increased double. Hence, a scheme of reducing a random access procedure itself may be advantageous in aspect of latency reduction specifically. Moreover, by reducing a physical channel transmitting/receiving procedure related to a random access procedure, it is also able to save corresponding resources.

Typically, in transmitting an RACH signal, it is able to consider simultaneously transmitting or including data (e.g., contention resolution information/contention resolution ID). Through this, a time and resource consumed for an initial access can be efficiently saved. For example, when a UE transmits an RACH signal, a contention resolution ID is included. Having received it, an eNB transmits an RAR to the corresponding UE in a manner that the detected contention resolution ID is included in the RAR. An RA-RNTI used (i.e., used for scrambling and/or CRC masking and/or a search space) for PDCCH/PDSCH corresponding to the RAR transmission may be configured as information on a resource and/or beam for the RACH signal. Typically, the RA-RNTI may be configured identical to an RNTI used for a data part in case of RACH transmission. Or, the RNTI used for the RAR transmission may be inferred from an RNTI used for a data part of RACH or calculated using the RNTI as a parameter.

When a contention resolution ID included in RAR in case of UE's success in RAR detection and a contention resolution ID transmitted by the corresponding UE are compared with each other, if they are identical, a UE end assume that the contention resolution is successful and then utilizes the rest of information (e.g., TA command, temporary C-RNTI, C-RNTI, etc.) sent by the RAR for the next transmission. Particularly, in the information transmitted by the RAR, an RNTI utilized for a data part of an RACH signal may be included. In order to inform an eNB of the RAR detection success, the UE may transmit PUSCH or PUCCH using the corresponding informations.

As another access scheme, an incorrect beam selection in transmitting RACH requires an RACH retransmission to reselect a beam pattern and the overall latency may be elongated. To prevent this, a UE may transmit RACH on a plurality of xPRACH resources. A plurality of the xPRACH resources may correspond to different beam patterns, respectively. Yet, in case of transmitting an RAR for each of a plurality of the xPRACH resources, since an eNB transmits a plurality of RARs for the same UE unnecessarily, DL resources may be wasted eventually. Moreover, if failing in appropriately coping with processes (e.g., Msg3 transmission) after each RAR transmission, there may be unnecessary retransmission and resource waste corresponding to the unnecessary retransmission.

To solve such a problem, in transmitting xPRACH, it may be useful to display/include information on a UE. Particularly, the information on the UE may include transmitting data together with PRACH or transmitting data included in PRACH. An eNB can recognize whether a plurality of XPRACHs received/detected from the corresponding information has come from the same UE. Although a specific UE transmits a plurality of xPRACHs, an RAR message may be sent once only.

Likewise, in order to prevent overall retransmission of an RAR due to an incorrect beam selection, a UE can be made to select a suitable RAR again in case of receiving a plurality of RARs by transmitting a corresponding RAR message in which information for classifying a UE is contained. Particularly, a beam is selected by an eNB selection based on scheduling within an RAR window and an RAR may be then transmitted through the corresponding beam. Typically, the information for classifying the UE may include a contention resolution ID or a value derivable from a contention resolution ID. Moreover, an RAR message for a same UE may include specific values (e.g., resource allocated in a UL grant for Msg3), which are set identically.

In a situation that a UE transmits xPRACH on a plurality of resources, if information on the UE is not included, it is able to consider transmitting additional information in order not to perform an Msg3 reception attempt and retransmission scheduling on each RAR message. For example, when a UE detects a specific RAR message and then transmits an Msg3 from a UL grant included in the corresponding RAR message, information on a plurality of xPRACHs transmitted by the UE may be included. Based on the information on a plurality of the xPRACHs, an eNB separately classifies/recognizes a transmission to the same UE, thereby not indicating a corresponding Msg3 retransmission for an unselected RAR message.

<Transmission and Contents of RAR>

As described above, after a UE has transmitted an RACH signal, an eNB transmits an RAR for the corresponding RACH signal. And, the UE attempts RAR detection during a specific interval configured in advance or by a higher layer. The RAR transmission may include transmitting RARs corresponding to RACH signals from a plurality of UEs through single PDCCH/PDSCH simultaneously according to a resource used for the RACH signal transmission.

The resource used for the RACH signal may be classified into a time domain resource and/or a frequency resource (set) and/or a code domain resource and/or a Tx or Rx beam information/index. In the above description, a code domain may indicate a preamble sequence index. Typically, it is preferable that RACH signals corresponding to RAR transmitted on the same PDSCH/PDSCH correspond to a case of the same beam information and the same time domain resource. An RA-RNTI value may be set differently according to a resource (set) for the RACH signal. It is obvious that a parameter used in determining RA-RNTI is variable depending on a classifying method.

An RAR for each RACH signal may configure TA information, and/or contention resolution information or ID, and/or temporary C-RNTI or C-RNTI, and/or information for Msg3 transmission and the like as contents. Particularly, the TA information may include TA information on a corresponding UE after estimating UL synchronization from a preamble (or a preamble and a data part). The contention resolution information or the contention resolution ID can be derived using data transmitted in RACH signaling or a corresponding data. A UE having received the RAR can perform contention resolution by comparing the information with the contention resolution ID transmitted together in the RACH signal transmission.

A target of the contention resolution may include a case that a plurality of RACH signals are transmitted on the same resources (e.g., time resource and frequency resource), and/or preamble sequences for the UL synchronization estimation usage are the same. The temporary C-RNTI or the C-RNTI may be utilized for a general UL transmission and/or a generation and transmission of Demodulation RS (DMRS). Typically, according to the present invention, since contention resolution will be performed at an RAR end, it may be limited to C-RNTI.

The information for Msg3 transmission may indicate a UL transmission method for reporting to an eNB that a UE successfully received an RAR and successfully completed a contention resolution process. Particularly, in a next generation wireless communication system, a type of Msg3 may include PUCCH and/or PUSCH. More particularly, Msg3 may have a PUSCH type in case of an initial access or a PUCCH type in other cases (e.g., a case by a PDCCH order or a case of an access for the SR transmission purpose). In case that Msg3 is PUSCH, a UL grant may be included in an RAR. In case that Msg3 is PUCCH, a PUCCH resource index may be included.

Alternatively, in transmitting an RAR, transport channel information of Msg3 may be included. For example, information on MSg3 transport channel may have a (sub)header type of RAR or be indicated as an RAR content type. Moreover, a transport channel of Msg3 may be configured differently according to an RACH signal transmitting method (e.g., a preamble index and/or a frequency resource (set) index). Typically, in case that Msg3 has a PUSCH type, it may include CSI information. Whether the corresponding CSI information is included may be always included or indicated by an RAR.

<Operation Example of Random Access Procedure>

For clarity of description, a random access procedure of the present invention shall be described with reference to an initial access.

Figure 13:
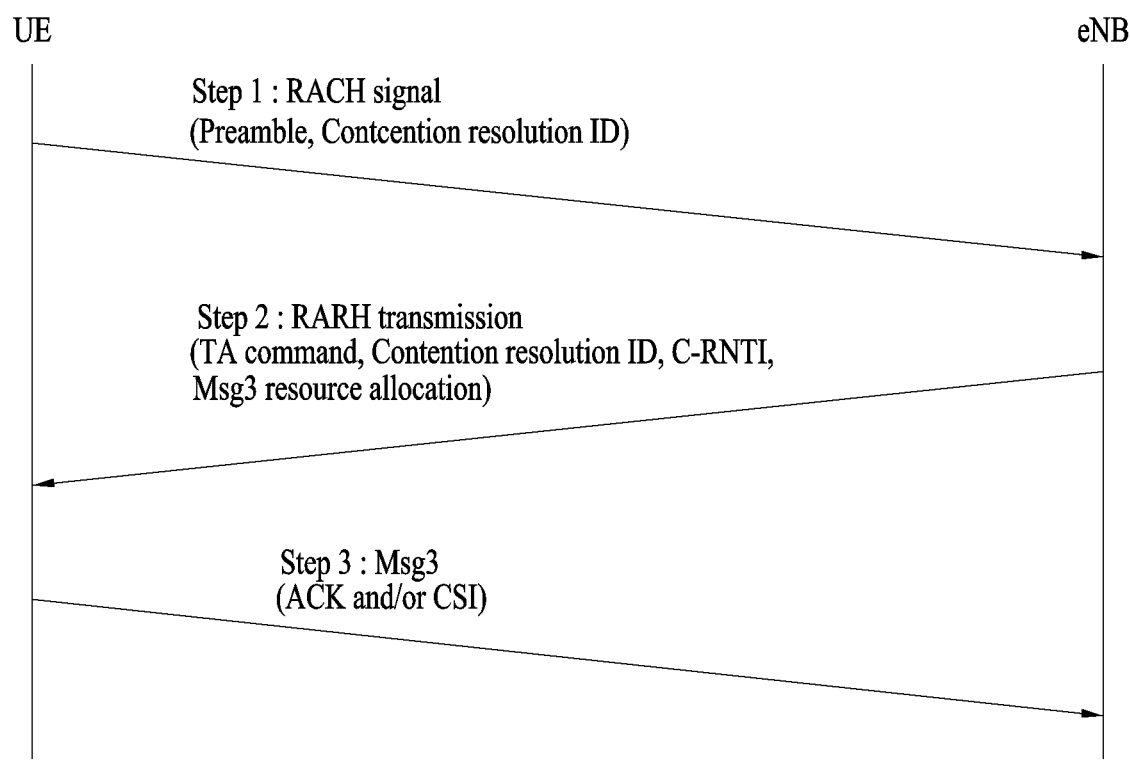
FIG. 13 shows one example of a random access procedure according to an embodiment of the present invention.

FIG. 13 shows one example of a random access procedure according to an embodiment of the present invention.

An eNB broadcasts information (e.g., time resource (set) and/or frequency resource (set) and/or preamble index (set) and/or Msg3 transport channel, etc.) for transmitting an RACH signal for a corresponding cell through SIB and the like.

Based on the corresponding information, a UE transmits an RACH signal to the eNB in Step 1 of FIG. 13. The RACH signal may be transmitted with reference to DL synchronization (e.g., assuming a TA value as 0). The RACH signal may be configured with a preamble transmission (Tx) part for UL synchronization estimation and a data transmission (Tx) part for additional information transmission. Of course, the data transmission part may have a structure similar to that of PUSCH or a preamble type. The eNB may attempt RACH signal detection from an RACH resource (set), and the following results A) to D) are possible.

A) In case of detecting both a preamble Tx part and a data Tx part, the eNB performs an RAR transmission in a specific interval (e.g., an RAR window) configured in advance or by a higher layer. The corresponding RAR may include contention resolution information/ID for a corresponding RACH signal.

B) In case of failing in direction of a data Tx part despite detecting a preamble Tx part, the data Tx part detection failure may correspond to a case of failing in CRC for data. In aspect of an eNB, an RAR for a corresponding UE is not generated. In this case, an RAR of an RACH signal for a UE detected up to the data Tx part is transmitted only. Typically, if an eNB detects a preamble part only for all RACH signals in a resource set becoming a target of simultaneous transmission of RAR at a timing of detecting an RACH signal but fails in detecting a data part, a value for contention resolution information/contention resolution ID in transmitting RAR is set to a (previously defined) specific value. In this case, a transport channel of Msg3 for RAR may be limited to PUSCH, and a UL grant for it may be included as RAR contents.

C) In case of failing in detecting both a preamble Tx part and a data Tx part, an RAR for a corresponding UE is not generated in aspect of an eNB. In this case, an RAR of an RACH signal for a detected UE is transmitted only.

D) In case of succeeding in detecting a data Tx part despite failing in detecting a preamble Tx part, an eNB performs an RAR transmission in a specific interval (e.g., an RAR window) configured in advance or by a higher layer. Yet, the eNB may need a process of estimating UL synchronization using the data Tx part, which may be accompanied by an eNB complexity increase in some cases. Alternatively, it may operate in the same manner as the case of failing in detecting both of the preamble Tx part and the data Tx part.

As a next process, in Step 2 of FIG. 13, the UE may attempt a detection of an RAR transmitted by the eNB within an RAR window (configured in advance or by a higher layer). According to the RAR detection result, the following results a) to d) are possible.

a) If a UE succeeds in RAR detection within an RAR window and a corresponding RAR corresponds to a preamble Tx part and a data Tx part transmitted by the UE, the UE can regard contention resolution information/ID extracted from the detected RAR and contention resolution information/ID utilized for RACH signal transmission as identical to each other. Namely, the UE can assume that the contention resolution has been completed successfully. The UE can configure (temporary) C-RNTI in the information detected from the RAR as C-RNTI that will be utilized for the future transmission. Thereafter, the UE may transmit Msg3 by utilizing information (e.g., TA command, and/or (temporary) C-RNTI, and/or Msg3 transmitting method) received from the RAR. And, the object of the corresponding Msg3 transmission is to enable the UE to inform the eNB of the RAR reception success and the contention resolution success.

b) If a UE succeeds in RAR detection within an RAR window and a corresponding RAR corresponds to a preamble Tx part transmitted by the UE but does not correspond to a data Tx part, the UE can retransmit an RACH signal after a specific interval (configured in advance or by a higher layer) from an RAR detection timing or an RAR window end timing. If information relevant to backoff exists and is detected in case of RAR detection, it is able to retransmit an RACH signal by applying the backoff.

c) If a UE succeeds in RAR detection within an RAR window and a corresponding RAR does not correspond to any one of a preamble Tx part and a data Tx part transmitted by the UE, the UE can retransmit an RACH signal after a specific interval (configured in advance or by a higher layer) from an RAR detection timing or an RAR window end timing. If information relevant to backoff exists and is detected in case of RAR detection, it is able to retransmit an RACH signal by applying the backoff.

d) If a UE fails in RAR detection within an RAR window, the UE can retransmit an RACH signal after a specific interval (configured in advance or by a higher layer) from an RAR window end timing.

In some implementations, in Step 3 of FIG. 13, if the UE successfully detects an RAR corresponding to a preamble Tx part and a data Tx part of an RACH signal, it is able to transmit Msg3. The Msg3 may have a PUCCH type including ACK information or a PUSCH type including specific information (e.g., aperiodic or periodic CSI and/or ACK information). In case of successfully receiving the Msg3 transmitted by the UE, it is able to determine that the UE successfully detected RAR.

<Transmission Power Configuration of Random Access Channel>

In a next generation wireless communication system, a specific RACH resource may be utilized for a separate purpose (e.g., a beam change request, and/or a beam refinement reference signal initiation request, and/or a scheduling request). Typically, the corresponding RACH resource may not be used for an initial access and/or a PDCCH order based RACH transmission.

In such a case, power for RACH may be different per RACH resource set. Particularly, regarding the power configuration for an RACH resource corresponding to the general RACH transmission purpose, an initial power, a ramping step and the like can be determined in a manner of basically considering a power ramping in case of performing a retransmission. On the other hand, a power (i.e., an initial power or ramping step) for an RACH resource corresponding to the above-described separate purpose and the like may be independently configured through separate signaling. Or, a final RACH power, which considers a power increment by a ramping in case of performing an initial access or a PDCCH order based random access procedure, may be set as a power for the corresponding RACH resource.

According to the aforementioned present invention, additional information can be efficiently transmitted in transmitting an RACH signal and a utilization resource can be efficiently managed through simplification of a random access procedure using the corresponding information.

Figure 14:
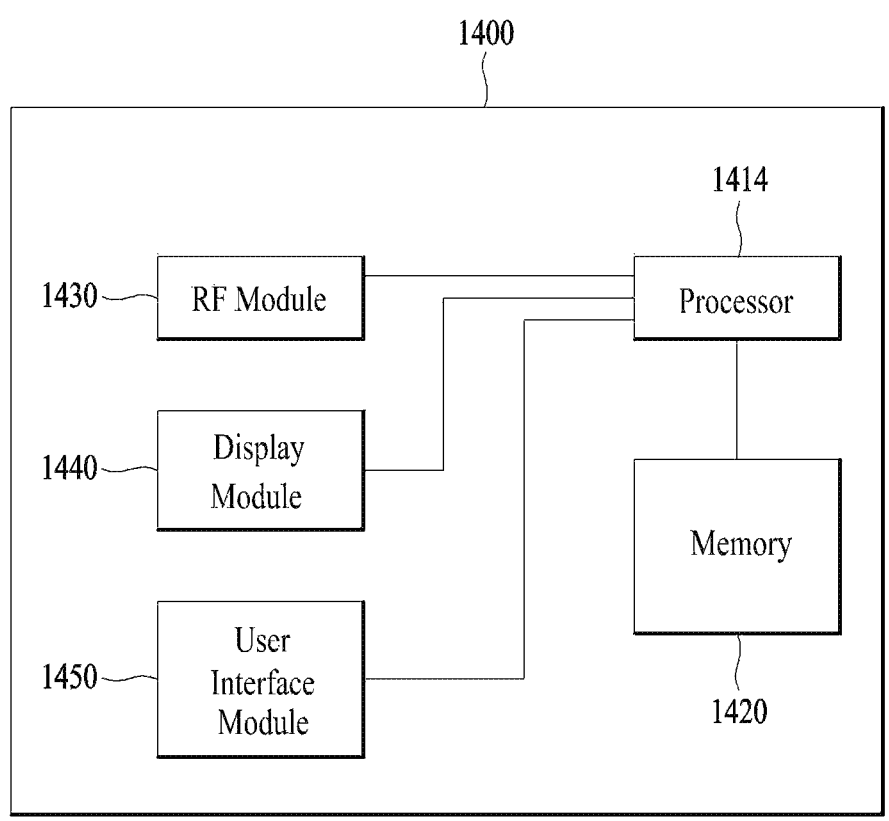
FIG. 14 is a block diagram of a communication apparatus according to an embodiment of the present invention.

FIG. 14 is a block diagram of a communication apparatus according to an embodiment of the present invention.

Referring to FIG. 14, a communication apparatus 1400 includes a processor 1410, a memory 1420, a Radio Frequency (RF) module 1430, a display module 1440 and a user interface module 1450.

The communication apparatus 1400 is shown for convenience of description and some modules thereof may be omitted. In addition, the communication apparatus 1400 may further include necessary modules. In addition, some modules of the communication apparatus 1400 may be subdivided. The processor 1410 is configured to perform an operation of the embodiment of the present invention described with respect to the drawings. For a detailed description of the operation of the processor 1410, reference may be made to the description associated with FIGS. 1 to 13.

The memory 1420 is connected to the processor 1410 so as to store an operating system, an application, program code, data and the like. The RF module 1430 is connected to the processor 1410 so as to perform a function for converting a baseband signal into a radio signal or converting a radio signal into a baseband signal. The RF module 1430 performs analog conversion, amplification, filtering and frequency up-conversion or inverse processes thereof. The display module 1440 is connected to the processor 1410 so as to display a variety of information. As the display module 1440, although not limited thereto, a well-known device such as a Liquid Crystal Display (LCD), a Light Emitting Diode (LED), or an Organic Light Emitting Diode (OLED) may be used. The user interface module 1450 is connected to the processor 1410 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the aforementioned method of performing a random access procedure in a next generation wireless communication system and apparatus therefor are described by focusing on examples applying to the 3GPP LTE system, they are applicable to various wireless communication systems as well as to the 3GPP LTE system.

What is claimed is:

1. A method of performing a random access procedure by a user equipment in a wireless communication system, the method comprising: obtaining, from a higher layer of the user equipment, an indication to perform a simplified random access procedure; transmitting a random access signal to a base station in a transmission interval; and receiving, from the base station, a random access response (RAR) signal including a timing advance (TA) command in response to the random access signal; and transmitting, to the base station, only a physical uplink control channel (PUCCH) including ACK information after detecting the RAR signal which is in response to the random access signal, wherein the random access signal includes a transmission of a random access preamble in a physical random access channel (PRACH), a transmission of physical uplink shared channel (PUSCH), and a contention resolution ID, wherein a beam direction for the transmission of the random access preamble in the PRACH and a beam direction for the transmission of the PUSCH are equal to each other, wherein a TA value of the transmission of the random access preamble in the PRACH is configured to zero and a TA value of the transmission of the PUSCH is configured to zero, and wherein the RAR signal further includes the contention resolution ID and a physical uplink control channel (PUCCH) resource indicator.

2. A user equipment configured to operate in a wireless communication system, the user equipment comprising: a wireless communication module; and a processor connected to the wireless communication module and configured to perform operations comprising: obtaining, from a higher layer of the user equipment, an indication to perform a simplified random access procedure; transmitting a random access signal to a base station in a transmission interval; and receiving, from the base station, a random access response (RAR) signal including a timing advance (TA) command in response to the random access signal; and transmitting, to the base station, only a physical uplink control channel (PUCCH) including ACK information after detecting the RAR signal which is in response to the random access signal, wherein the random access signal includes a transmission of a random access preamble in a physical random access channel (PRACH), a transmission of physical uplink shared channel (PUSCH), and a contention resolution ID, wherein a beam direction for the transmission of the random access preamble in the PRACH and a beam direction for the transmission of the PUSCH are equal to each other, wherein a TA value of the transmission of the random access preamble in the PRACH is configured to zero and a TA value of the transmission of the PUSCH is configured to zero, and wherein the RAR signal further includes the contention resolution ID and a physical uplink control channel (PUCCH) resource indicator.

* * * * *